March 24, 1942. R. S. DRUMMOND 2,277,041
APPARATUS FOR CROWNING INTERNAL GEARS
Filed June 14, 1937 2 Sheets-Sheet 1
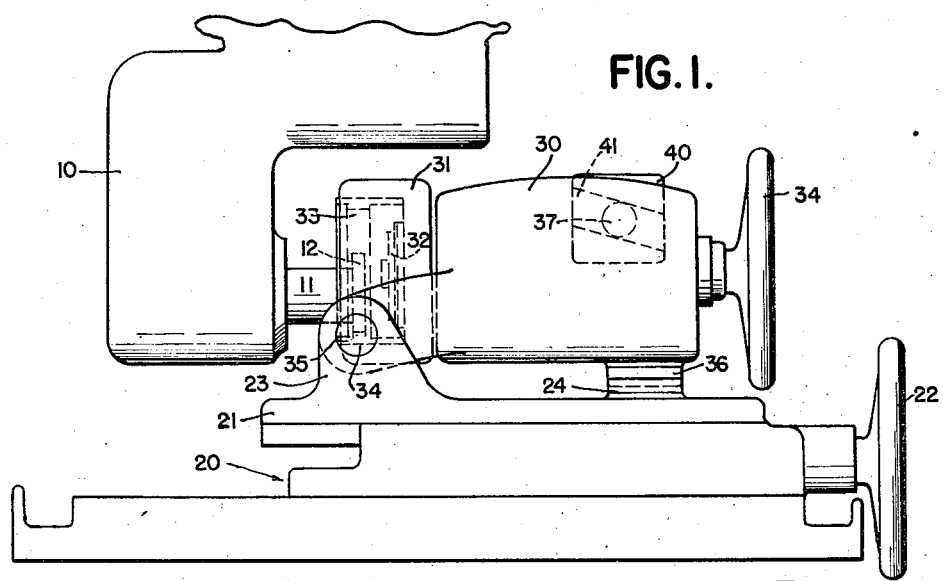
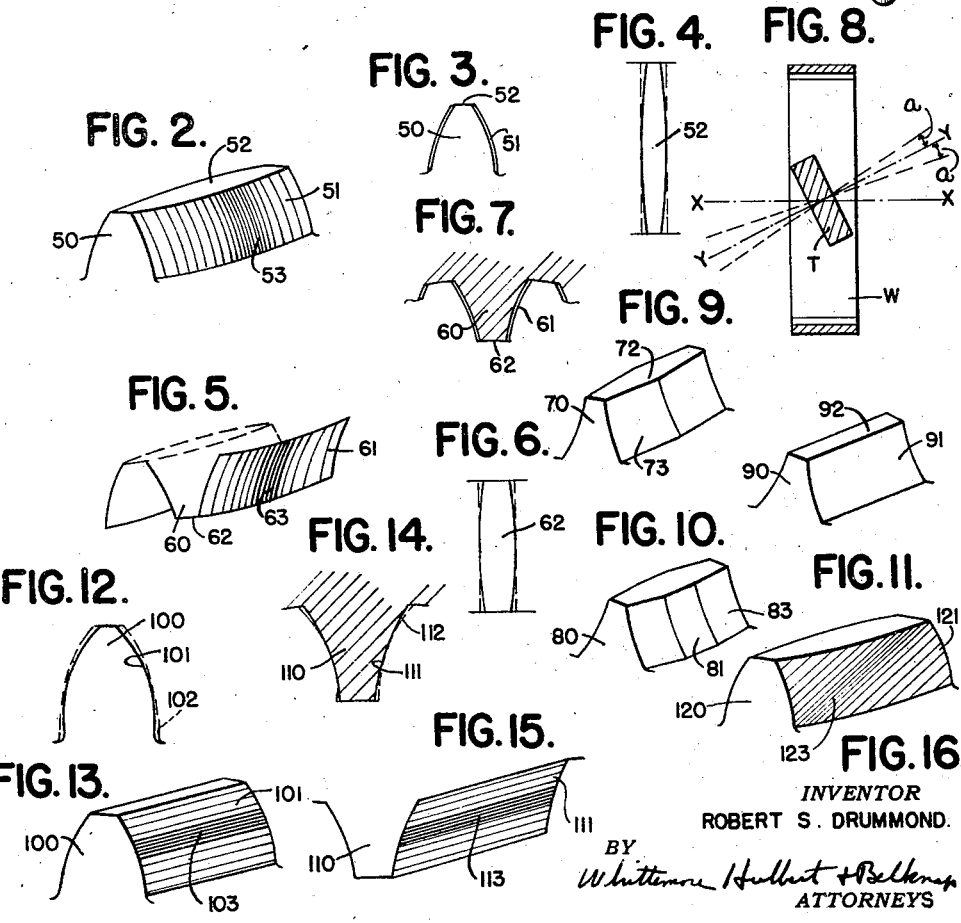
INVENTOR
ROBERT S. DRUMMOND.
BY
ATTORNEYS March 24, 1942.  R. S. DRUMMOND  2,277,041
APPARATUS FOR CROWNING INTERNAL GEARS
Filed June 14, 1937  2 Sheets-Sheet 2

INVENTOR.
ROBERT S. DRUMMOND
BY
Whittemore Hulbert & Belknap
ATTORNEYS

Patented Mar. 24, 1942

2,277,041

UNITED STATES PATENT OFFICE 2,277,041

APPARATUS FOR CROWNING INTERNAL GEARS

Robert S. Drummond, Detroit, Mich.

Application June 14, 1937, Serial No. 148,225

4 Claims. (Cl. 90—1.6)

This invention relates to gear cutting machines for crowning internal gears. It is an object of this invention to provide a gear cutting machine which will finish the teeth of internal gears with a crowned effect.

It is a further object of the invention to provide an internal gear finishing machine in which the tool supporting carriage is given a pivotal motion in synchronism with a translatory motion.

In gear finishing machines of this type, the gear being finished is translated relative to the finishing tool for the purpose of distributing the finishing effect across the faces of the teeth of the gear being finished. In the present machine, mechanism is provided which will cause the work carrying portion to be pivoted equal amounts in opposite directions. By this means the faces of the teeth of the gear being finished are given a curved contour from end to end. When involute teeth of gears mesh, if the teeth are unmodified from end to end and from top to bottom, there is theoretically contact across the entire face of the teeth, as long as conditions are perfect. Gears so formed will mesh properly without noise or interference. However, in practical setups, where the axes of either or both of the gears may be improperly aligned, or for other reasons, gears so formed ordinarily will be noisy and some interference will be present.

Another consideration involved in forming teeth in the manner contemplated in the present invention is the question of bringing the gears into mesh with one another. As can readily be seen, if the gear teeth are unmodified, the alignment of the gears must be perfect in order to bring the gears into mesh without interference and the consequent noise. It has been found that if the teeth of the gears are modified so as to be more convex, both from end to end and from top to bottom, than unmodified teeth, that these teeth will mesh without interference and will run quietly, even though slight errors may exist in alignment of axes, etc.

In the accompanying drawings:

Fig. 1 is an elevation of a portion of an internal gear finishing machine embodying my present invention;

Fig. 2 is a perspective of tooth on an external gear showing modification or crowning from end to end;

Fig. 3 is an end view of the tooth shown in Fig. 2;

Fig. 4 is a plan view of the tooth shown in Fig. 2 with dotted lines indicating the contour of an unmodified tooth;

Fig. 5 is a perspective of a tooth on an internal gear modified according to the present invention;

Fig. 6 is a plan view of the tooth shown in Fig. 5 with the outline of an unmodified tooth shown in dotted lines;

Fig. 7 is an end view of the tooth shown in Fig. 5;

Fig. 8 is a diagrammatic showing of the engagement between an internal gear cutter and an internal gear according to another modification of my invention;

Figs. 9 and 10 are perspective views of internal teeth as modified according to the embodiment of the invention illustrated in Fig. 8;

Fig. 11 is a perspective of an unmodified internal tooth;

Fig. 12 is an end view of an external tooth modified by crowning from top to bottom and in this figure in dotted lines is illustrated for comparison an unmodified external tooth;

Fig. 13 is a perspective of the tooth illustrated in Fig. 12;

Fig. 14 is an end view of an internal tooth modified by crowning from top to bottom;

Fig. 15 is a perspective of the tooth shown in Fig. 14, and

Fig. 16 is a perspective of a modified crowned external helical tooth.

Figure 18:
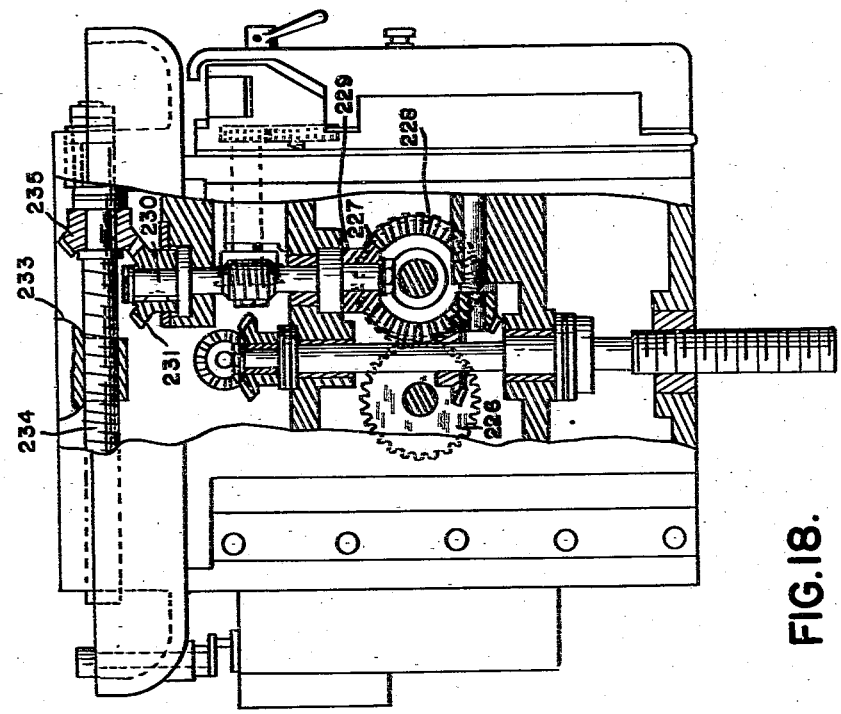
Fig. 18 is a front elevation with parts broken away of the mechanism for providing feeding motion and translation of the work supporting element.

In Fig. 1 I have illustrated a portion of an internal gear finishing machine. This machine may be of the type illustrated in my prior copending application Serial No. 90,401, filed July 13, 1936, to which reference should be had for a complete description of the parts of the machine not shown herein.

Briefly, however, this type of machine includes a frame portion to which is secured a tool carrying head. The tool carrying head is illustrated in Fig. 1 at 10, and is adapted to be mounted on the machine for adjustment about a vertical axis. The work carriage illustrated in Fig. 1 at 20 is mounted on the machine for adjustment in a vertical direction and also for reciprocation in a horizontal direction. Suitable motor means are carried by the tool carrying portion of the machine for rotating the tool and the internal gear to be finished is mounted for free rotation about its axis.

In Fig. 1, 10 illustrates the tool carrying head which is mounted as above stated for adjustment about a vertical axis. The work carriage generally indicated at 20 will be reciprocated horizontally by suitable mechanism (not shown). A portion of the work carriage indicated at 21 is mounted in a key-way in the carriage 20 and a hand wheel 22, together with suitable mechanism, provides for adjustment of the portion 21 in a horizontal direction. During the operation of the machine parts 20 and 21 are fixed relative to each other, the relative adjustment being provided merely for the purpose of preliminary positioning of the work relative to the tool. The portion 21 has a pair of upstanding lugs 23 with coaxial openings 35 therein. These openings are adapted to form a trunnion support for the work carrying head generally indicated at 30. This work carrying head has secured thereto cylindrical projections 34 which are received within the aligned openings 35. This provides for pivotal adjustment of the work carrying head 30 about the axis of the members 34. The work carrying head has a work supporting member 31 in which is clamped by suitable clamping means indicated at 32, the internal gear 33 which is to be finished. A hand wheel 34, operable through suitable mechanism is provided for clamping the gear to be finished in the portion 31.

It should be noted that the axis about which the work carrying head pivots is closely adjacent to the meshing engagement between the internal gear to be finished and the cutting tool 12.

Upon the opposite end of the work carrying head 30 from the trunnion support previously described, is a guiding means comprising a pair of upstanding spaced flanges 24 located on the member 21 and a downwardly projecting flange 36 secured to or integrally a part of the work carrying head 30. The arrangement of these members is such that the flanges 24 slidably receive therebetween the flange 36 and thereby guide the head so that the pivotal motion thereof is limited to motion about the axis of the trunnion support.

Figure 17:
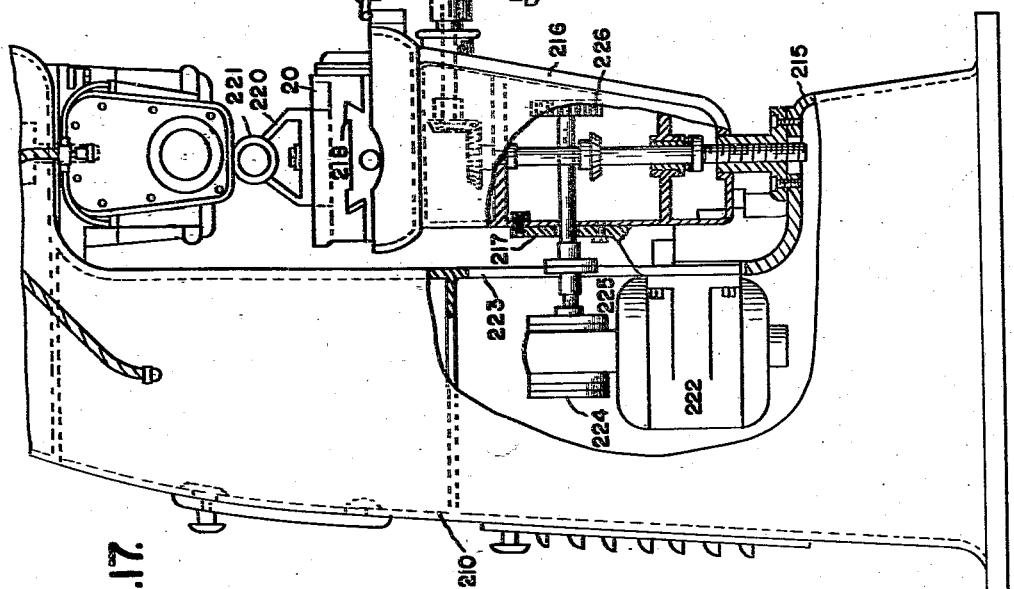
Fig. 17 is a side elevation partly in section of the type of gear finishing machine with which my improved crowning mechanism is employed.

In Figs. 17 and 18 I have illustrated automatic mechanism for translating carriage 20 in horizontal planes. This mechanism is fully described in my copending application identified above and will be described very briefly here.

It will further be understood that Figures 17 and 18 illustrate a gear finishing machine of the type to which my improved crowning mechanism is attached. In Figures 17 and 18 the crowning mechanism is not shown.

The crowning machine comprises a frame 210 having an upwardly projecting knee 215 above which is supported for vertical adjustment a table 216. The table 216 is accurately guided for vertical movement relative to the frame 210. Carried by the table 216 and horizontally adjustable thereon in ways 218 is a carriage 20 having a support 220 thereon for a gear arbor indicated generally at 221.

A motor 222 is secured to the table 216 by a bracket 217, the motor being received within the hollow frame 210 and connected to suitable driving mechanism carried by the table 216 through a slot 223 formed in the forward face of the frame 210. As will now be described in detail, the motor 222 is adapted to reciprocate the carriage 20 horizontally.

The motor 222, as seen in Figure 17, is connected through a suitable speed changing device 224 and flexible coupling 225 to a gear 226. As best seen in Figure 18, the gear 226 is adapted to mesh with and drive a gear 227 which in turn drives a co-axial bevel gear 228. The bevel gear 228 in turn meshes with and drives a second bevel gear 229 secured to a vertically extending shaft 230. The shaft 230 has keyed or otherwise secured thereto a bevel gear 231.

The horizontally movable carriage 20 has an independent lug 233 which is internally threaded to cooperate with a threaded horizontal feed screw 234 journalled for rotation in the vertically adjustable table. As will be apparent from Figure 18, the rotation of feed screw will cause a slow translation of the carriage 20. Feed screw 234 has keyed or otherwise secured thereto a bevel gear 235 meshing with the bevel gear 231. From the foregoing it will be apparent that operation of the motor 222 through the medium of gears 226, 227, 228, 229, 231 and 235 causes a slow translation of the carriage 20 relative to the table 18.

Suitable automatically operated switches are provided for traversing rotation of the motor 222 so as to cause the carriage 20 to reciprocate back and forth. Means are also provided for causing an automatic upward feeding movement of the table 216 at the end of each stroke of the carriage 20, but this forms no part of the present invention and will not be described herein.

In order to provide the pivotal motion in synchronism with the reciprocation of the work carrying head, a pin 37 is rigidly secured to the head 30. Attached to a convenient portion of the frame is a member 40 in which is provided an inclined groove 41. The member 40 is stationary relative to the reciprocatory motion of the carriage 20 but moves vertically with it. It is conveniently carried by suitable means secured to a vertically adjustable table which carries the carriage 20 (see my co-pending application Serial No. 90,501, to which reference is made above). The pin 37 is received in the groove 41 and is adapted to slide therein upon reciprocation of the work carrying head. The relationship between the trunnion support and the inclined groove 41 is such that when the pin 37 is in the mid position of the groove, the axis of the head is horizontal and the gear cutting tool is in mesh with the internal gear being cut substantially at the center thereof from side to side.

In operation, the tool 12 is rotated by suitable motor means carried by the head 10, and the rotation of this tool member will rotate the internal gear 33. The head 10 is so positioned relative to the work carriage that the tool and the gear being cut are in mesh with their axes lying in no common plane and crossed at an angle of less than 30°. Suitable cutting edges are provided on the teeth of the tool and these cutting edges remove small shavings from the teeth of the internal gear being cut. In order to distribute the cutting action of the tool across the faces of the teeth of the gear being cut, a translatory motion is imparted to the work carrying head. In the embodiment shown, this translation takes place parallel to the axis of the gear being finished. The amplitude of this translation is sufficient so that the cutting action of the tool is distributed uniformly across the face of the teeth of the gear being cut. During such translation, the axes of the tool and gear are maintained rigidly spaced, so that a cut of predetermined depth will be taken from the face of the teeth of the gear being finished. Intermittently, and preferably at the end of each translatory motion, the work carriage 20 is fed vertically upward toward the tool to position the tool and gear for the next succeeding cut across the face of the teeth. At the same time by suitable mechanism the direction of rotation of the tool and therefore the gear being cut, is reversed.

Translation of the work carriage 20 to the left in Fig. 1 will cause the head 30 to pivot about the axis 34 in a counter-clockwise direction. While this occurs, the cutting tool 12 is moved to the right relative to the gear 33. The result of this will be that the cutting tool 12 will take an increased cut on the right hand side of the gear 33. Upon translation in the other direction, the head 30 will pivot in a clockwise direction, and as the cutter crosses the center of the gear, the head 30 will again be horizontal. Further translation to the right will cause continued clockwise motion of the head 30 and will cause the cutter 12 to take a cut of a gradually increasing depth toward the left hand side of the gear 30. The result of this will be that the teeth of the internal gear 30 will be crowned as illustrated in Figs. 5 to 7 inclusive.

For purposes of comparison, I have illustrated in Fig. 2 a tooth 50 of an external spur gear with faces 51 crowned from end to end. As a result of this, the top of the tooth as indicated at 52 has curved sides and Fig. 3 illustrates an end view of this tooth illustrating the curvature of the faces 51. In Fig. 4 I have shown a view of the top of the tooth 52 and the dotted lines in this figure indicate for purposes of comparison the top of an unmodified tooth. I have indicated by the numeral 53 in Fig. 2 the area of greatest bearing of this tooth. A tooth of this type is adapted to run in mesh with an unmodified conjugate tooth quietly and efficiently, even though there may be small errors in axial positioning of the meshed gears or other errors due to strain of the parts. In Fig. 5 I have illustrated a tooth 60 of an internal spur gear having a bottom portion 62 and faces 61. These teeth are modified in a manner similar to the external tooth shown in Fig. 2, and I have illustrated by the shaded portion 63 the area of greatest bearing. Fig. 7 shows an end view of this tooth and Fig. 6 shows a plan of the top of the tooth, with the dotted lines indicating the top of an unmodified tooth.

It will be apparent that various combinations may be resorted to embodying the improved results of teeth crowned in the foregoing manner. For example, if the internal teeth are unmodified and the external teeth are modified, as shown in Fig. 2, the improved results of crowning will be obtained in operation. At the same time, if the internal teeth are modified as shown best in Fig. 5, these teeth will run with unmodified external teeth and retain the improved results of crowned tooth operation. Also, it is possible to use a combination of internal and external teeth in which both external and internal teeth are crowned as shown.

In my co-pending application Ser. No. 149,525 filed June 21, 1937, I have illustrated mechanism for crowning internal teeth from top to bottom. It is desirable in many instances to provide different forms of crowning of the teeth in order that the bearing will not take place near the top or bottom of the teeth. In Fig. 12 I have illustrated an external spur tooth crowned from top to bottom. In this figure the external tooth 100 has faces 101 which are modified from an ordinary involute external tooth 102 indicated for purposes of comparison by dotted lines. Fig. 13 shows a perspective of this tooth 100 and the shaded portion 103 indicates the area of greatest bearing.

In Figs. 14 and 15 I have illustrated an internal tooth 110 which has faces 111 which are modified from an involute tooth indicated by the dotted lines 112. In Fig. 15 the shaded area 113 indicates the area of greatest bearing on this type of tooth.

As, in connection with the crowning from end to end previously described, it will be apparent that in the meshing engagement of external and internal gears the improved results of crowning from top to bottom may be had by crowning either the external tooth as indicated in Fig. 12 or the internal tooth as indicated in Fig. 14, or both.

At the same time it will be understood that new and improved results will follow from combining the crowning effect from top to bottom with the crowning effect from end to end, and that various combinations may be resorted to. Of these, by way of example only, are the following: An external tooth crowned from end to end meshed with an internal tooth crowned from top to bottom; an external tooth crowned from top to bottom meshing with an internal tooth crowned from end to end, or either an internal or an external tooth without modification meshing with the other kind of tooth modified either by crowning from top to bottom, by crowning from end to end, or both.

In Fig. 8 I have illustrated diagrammatically a method by which internal teeth may be crowned from end to end without providing the crowning attachment illustrated in Fig. 1. In the type of machine disclosed in Fig. 1, as was stated above, the tool carrying head 10 is mounted for adjustment about a vertical axis. This adjustment is ordinarily intended for setting the cutting tool's axis relative to the axis of the gear being cut at a predetermined angle. This adjustment of the cutter head 10, however, also provides means whereby the teeth of an internal gear may be given a shape corresponding somewhat to the crown shape resulting from the operation of my crowning attachment and including many of its advantages. Fig. 11 illustrates the shape of an internal tooth 90 as it would be finished in an internal gear finishing machine without my crowning attachment and without practicing the method of operation about to be described.

In order to crown teeth without employing the crowning attachment mentioned, the method comprises finishing the gear as in the normal manner by reciprocating the work carriage sufficiently to impart the desired finish to the tooth of the internal gear. The carriage 20 is then translated so that the cutter meshes with the internal gear adjacent one side thereof. With the cutter and gear in mesh in this position, the cutter head is rotated about a vertical axis a predetermined amount. This amount is variable and will depend upon the amount of crowning effect desired to be imparted to the teeth of the internal gear. The head is then clamped in an adjusted position and the motor driving the finishing tool 12 is started, thus rotating the tool of the internal gear in mesh. The work carriage 20 is translated a limited amount so that the finishing action is limited to not more than half of the width of the gear being finished. The parts are then disengaged, the work carrying head 20 is translated so that the cutter 12 engages the opposite side of the gear 33, the head 10 is adjusted to the other side of its initial position and the process repeated. According to how much material is removed, and the length of translation of the carriage 20, the teeth of the internal gear will be finished as indicated in Figs. 9 and 10.

The tooth of the internal gear will be finished to the shape shown in Fig. 11 after the first finishing operation described in this method. This tooth 90 has faces 91 of generally involute contour and the top 92 will have generally parallel sides. Of course, if desired, the faces 91 of this tooth may be modified from the involute as indicated in Fig. 14, in any convenient manner, preferably as described in my aforementioned co-pending application.

The next steps of my method which involve finishing not more than half of the teeth of the internal gear at a time, will leave the teeth in the shape illustrated in Fig. 9 or 10. Fig. 9 illustrates a tooth 70 having faces 73 which are in effect beveled half way across the width of the tooth, and the top 72 of the tooth takes the form shown. If this finishing operation is not carried across half of the tooth but is limited to a lesser area, the tooth will take the form shown in Fig. 10. In this figure the tooth 80 has a portion of the face 81 left untouched by the second two steps of the finishing operation and has at either end portions 83 which are in effect beveled portions. The form of teeth illustrated in Figs. 9 and 10 are adapted to be brought into mesh with a pinion with a minimum amount of interference and noise, and will also run in mesh without the probability of end interference due to misalignment of axes or other reasons.

It will of course be understood that the modification of teeth as described in the foregoing is applicable to both spur and helical teeth. The spur tooth presents the simplest case, and has been used to illustrate the principles involved.

The differences between the operation of spur and helical teeth is well understood. Spur teeth in mesh engage in a theoretical line contact which extends across the faces of the teeth and is parallel to the axes of the gears. Helical teeth in mesh engage first at one side, and then progressively across the face, the result being that the theoretical instantaneous bearing is represented by a line extending diagonally across the tooth face at an angle depending on the helical angle of the gear.

In Fig. 16 I have illustrated a helical external tooth 120 having a face 121. Lines 123 indicate lines of theoretical instantaneous successive bearing between the tooth illustrated and a tooth conjugate thereto. Since these lines of bearing are diagonal, it is obvious that the modification imparted to the tooth face by the apparatus disclosed herein will be correspondingly different from the modification imparted to a spur tooth, but the principles remain the same and the same advantages outlined for spur teeth are obtained. The apparatus illustrated is of course adapted to operate to modify either spur or helical gears.

While I have illustrated a particular form of machine for practicing my method of crowning internal gears and have described two methods of crowning internal gears, it will be apparent to those skilled in the art that various additions, modifications, omissions and substitutions may be made which will be within the spirit and scope of my invention as defined in the appended claims.

What I claim as my invention is:

1. A machine for finishing internal gears comprising a tool supporting head, a tool in the form of a gear member rotatably mounted on said head, a work carriage mounted for translation, a work supporting head pivotally mounted on said carriage, means on said work supporting head for rotatably carrying an internal gear member to be finished in mesh with said tool with the axes of said gear members crossed at an angle less than 30°, means for rotating one of said gear members directly and the other gear member only through the intermeshing engagement of said members, means for translating said carriage in a direction oblique to the axis of said tool, and means operable automatically in accordance with translation of said carriage for pivoting said work supporting head about an axis passing substantially through the zone of meshing engagement of said members.

2. A machine for finishing internal gears comprising a tool supporting head, a tool in the form of a gear member rotatably mounted on said head, a work carriage mounted for translation, a work supporting head pivotally mounted on said carriage, means on said work supporting head for rotatably carrying an internal gear member to be finished in mesh with said tool with the axes of said gear members crossed at an angle less than 30°, means for rotating one of said gear members directly and the other gear member only through the intermeshing engagement of said members, means for translating said carriage in a direction oblique to the axis of said tool, and means operable automatically in accordance with translation of said carriage for pivoting said work supporting head about an axis passing substantially through the zone of meshing engagement of said gear members and substantially at right angles to the axis of said gear member to be finished.

3. In a gear crowning machine, a frame, a spindle support adjustable on said frame, a carriage mounted on said frame, a pivot support on said carriage, a second spindle support pivoted to said pivot support, spindles on said spindle supports, means mounting said carriage on said frame for translation in a plane parallel to the axis of the spindle carried by said first spindle support, said spindles adapted to carry an intermeshing gear and tool, the axis of said pivot support being located to pass substantially through the zone of meshing engagement of said gear and tool.

4. In a gear crowning machine, a frame, a spindle support adjustable on said frame, a carriage mounted on said frame, a pivot support on said carriage, a second spindle support pivoted to said pivot support, spindles on said spindle supports, means mounting said carriage on said frame for translation in a plane parallel to the axis of the spindle carried by said first spindle support, said spindles adapted to carry an intermeshing gear and tool, the axis of said pivot support being located to pass substantially through the zone of meshing engagement of said gear and tool and being substantially perpendicular to the axis of the spindle which carries the gear.

ROBERT S. DRUMMOND.